United States Patent

[11] 3,602,546

| [72] | Inventor | Paul C. Tabor<br>Clawson, Mich. |
|------|----------|--------------------------------|
| [21] | Appl. No. | 875,775 |
| [22] | Filed | Nov. 12, 1969 |
| [45] | Patented | Aug. 31, 1971 |
| [73] | Assignee | Meteor Research Limited<br>Roseville, Mich. |

[54] SEAT-ADJUSTING LINK
4 Claims, 4 Drawing Figs.

[52] U.S. Cl.................................................. 297/361,
297/379
[51] Int. Cl....................................................... A47c 3/00,
B60n 1/02
[50] Field of Search............................................. 297/361,
374–376, 379; 74/586

[56] References Cited
UNITED STATES PATENTS

| 688,088 | 12/1901 | Holtz | 297/375 |
| 3,424,492 | 1/1969 | Tabor | 297/361 |
| 3,523,593 | 8/1970 | Karasick | 279/374 X |

*Primary Examiner* — Paul R. Gilliam
*Attorney* — Bacon & Thomas

ABSTRACT: A laminar stack of interleaved friction plates, alternate plates being fixed, respectively, to relatively movable portions of an extensible link for adjusting a seat back. A fixed member has a surface at an acute angle to a face of said stack and a roller is arranged to be wedged between the surface and plates to frictionally bind the plates together. The roller can be moved from the wedged position to release the plates for relative sliding.

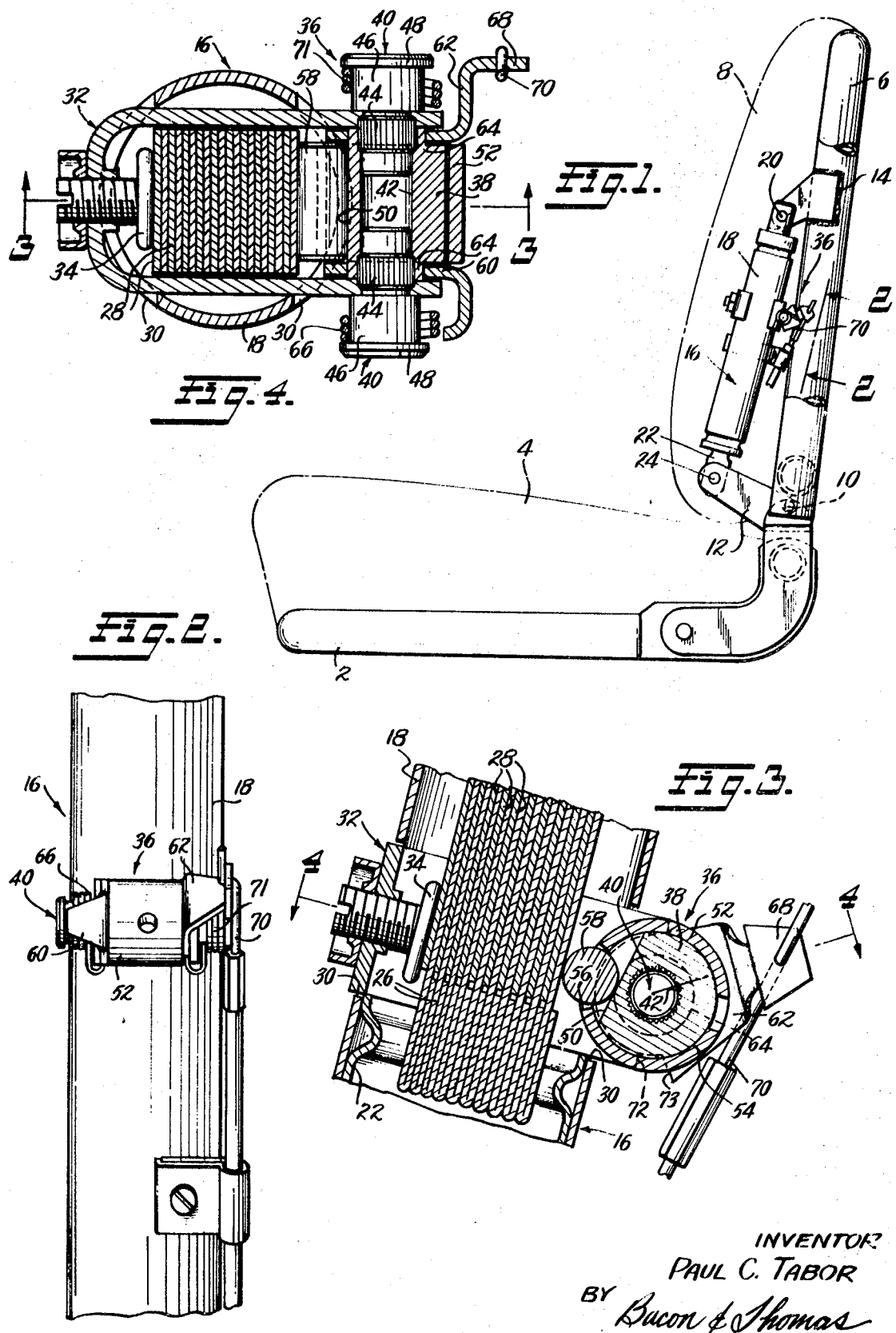

SEAT-ADJUSTING LINK

CROSS REFERENCE TO RELATED PATENT

The invention constitutes an improvement of a portion of the device shown in my U.S. Pat. No. 3,424,492, dated Jan. 28, 1969.

BACKGROUND OF THE INVENTION

This invention is in the field of adjustable links, particularly those employed for effecting adjustment of a tiltable seat back.

The seat back adjusting link disclosed in the above-mentioned patent employs a rotary cam to apply pressure to the laminated stack of friction plates to frictionally bind them together. However, such a cam arrangement involves sliding rotary friction at the bearing points of the cam. The rolling moment of the cam is not much greater than that of the frictional bearing surface. Further the rise of the cam tends to reduce the ease with which the cam will roll. These conditions tend to cancel and equalize the forces which were meant to cause the cam to rotate and apply the clamping force which frictionally binds the laminated stack of plates. If lubricants were not applied to the friction surfaces of the cam bearing but were applied to the face of the cam, the difference in the coefficient of friction would be sufficient to cause the cam to slide on the surface of the outermost laminate instead of rolling and applying the desired load. The friction at the bearings in this case would be of a value which was higher than the forces tending to rotate the cam. The use of lubricants and the manner of their application becomes very critical with this design.

SUMMARY OF THE INVENTION

The invention claimed herein is in the nature of an improvement on the pressure applying means disclosed in U.S. Pat. No. 3,424,492 and replaces rolling friction for the sliding friction of the patent cam. Broadly, the invention comprises positioning an inclined surface opposite the stack of plates and providing a roller between that inclined surface and the plates so that the roller may be wedged between the plates and surface to apply pressure to the plates and lock them against relative movement. Means are provided for forcibly moving the roller in a direction to accomplish the aforementioned wedging, preferably a spring means, and for moving the roller in the other direction to release the friction plates for sliding movement. The relative movement between the roller and plates is rolling motion and eliminates sliding or rotary friction in a bearing.

BRIEF DESCRIPTION OF THE DRAWINGS

FIG. 1 is a side elevational view of the seat adjuster of the present invention showing its relation to an automobile seat, portions of which are shown in broken line;

FIG. 2 is an enlarged fragmentary rear elevational view of a portion of FIG. 1;

FIG. 3 is a sectional view taken on the line 3—3 of FIG. 4; and

FIG. 4 is a transverse sectional view taken on the line 4—4 of FIG. 3.

DESCRIPTION OF A PREFERRED EMBODIMENT

In FIG. 1 there is shown an automobile seat comprising a horizontal frame portion 2 having a cushion 4 thereon. An upright back portion comprises a frame 6 having a cushion 8 thereon, with the frame 6 pivotally mounted on the frame 2 on a pivot axis shown at 10. The frame portion 2 is provided with a forwardly extending bracket 12 and the frame portion 6 is provided with a forwardly extending bracket 14. An adjustable link device 16 comprises an upper tubular member 18 pivotally mounted on the bracket 14 by a suitable pivot 20. A lower portion 22 of the link 16 is pivotally mounted, as at 24, on the bracket 12 and extends slidably into the lower end of the tubular portion 18. Preferably, the link 16 is concealed within the cushion 8 at one edge thereof. Referring to FIGS. 3 and 4, a plurality of friction plates 26 are secured to the lower portion 22 and are interleaved with similar friction plates 28 secured at their upper ends to the upper or outer link portion 18. The tubular upper link portion 18 is provided with opposed slots, or cutouts 30 through which a yoke member 32 extends. The yoke member has a bight portion supporting an adjustable abutment 34 positioned to engage an outermost plate 28 on one side of the stack of plates described. The legs of the yoke embrace or extend past opposite edges of the stack of plates, as seen in FIG. 4, and extend therebeyond through the other slot 30 and between those legs is supported a clamping and actuating assembly 36. The clamping and actuating assembly 36 is operable to apply lateral pressure to the stack of plates to frictionally clamp the interleaved plates against abutment 34, or to release the same therefrom whereby the link 16 may be extended or contracted and locked in adjusted position. Spring means, not shown, are provided between the link portions 18 and 22 urging the link to a fully contracted position whereby release of the friction plates will permit the seat back to swing upwardly and forwardly to its uppermost position without the application of a restoring force thereto. The structure thus far generally described is shown and described in greater detail in my aforementioned U.S Pat. No. 3,424,492 and reference is made thereto for a more detailed description of structural features except as to the details of the clamping and releasing assembly 36, which constitutes the improvement of the present invention.

A generally cylindrical member 38 is positioned between the legs of the yoke 32, at the ends thereof, and is held in fixed position relative thereto by pin means 40 extending through the legs of the yoke and into an axial bore 42 in the member 38. As shown in FIG. 4, two such pin means are provided, each having a splined or grooved portion 44 thereon. The portions 44 are force-fitted through the legs of the yoke and into the ends of the member 38 whereby that member is fixedly held between the legs of the yoke 32 and against rotation therein. The pins 40 are provided with enlarged outer portions 46 and outer flanged heads 48.

The cylindrical member 38 is cut away on one side to define a flat chordal surface 50 positioned at an acute angle to the adjacent outer of the stack of plates 26 and 28, the surface 50 defining a wedge-shaped space between the member 38 and the stack of friction plates. A cylindrical sleeve 52 extends around the outer cylindrical surface portion 52 of member 38 and is provided with an axial slot 56 on its inner side, in the wedge-shaped space previously referred to. Within the axial slot 56 is a cylindrical roller 58 of a diameter sufficient to span the distance from the outermost surface of an outer plate 28 to an intermediate portion of the oblique surface 50. The width of the slot 56 is only slightly greater than the diameter of the roller 58 so that rotation of the sleeve 52 about member 38 will cause the roller 58 to move longitudinally of the link 16 within the wedge-shaped space previously referred to.

Extending generally radially from the ends of the sleeve 52 are lever arms 60 and 62. The lever arm 60 is rigidly fixed to one end of sleeve 52 so as to rotate therewith as a unit and the lever 60 is journalized on a reduced end portion 64 of the generally cylindrical member 38 to thus rotatably mount sleeve 52 on member 38. A torsion spring 66 is positioned around the pin enlargement 46 and has one end (not shown) anchored against the adjacent yoke leg and the other end engaging the adjacent lever arm 60. The torsion spring 66 is so arranged that it normally biases the sleeve 52 to rotate in a counterclockwise direction, as seen in FIG. 3 to thus resiliently bias the roller 58 into wedging engagement with the outermost plate 28 and the surface 50. Thus, any attempt to forcibly swing the seat back frame 6 rearwardly in a direction to extend the link 16 will result in rolling the roller 58 on surface 50 in a downward direction to more tightly bind the friction plates against abutment 34 and render the apparatus self-energizing in that direction. The lever 62 is retained within the assembly similarly to lever 60 with the exception that it is not rigidly fixed to sleeve 52. The spring (71) which forces the lever arm 62 in a counterclockwise direction (FIG. 3) causes the surface 72 of the lever arm 62 to disengage from a surface 73 of sleeve 52. This allows relative rotary motion between the lever arm 62 and the sleeve 52. The lever 62 is extended laterally outwardly, then rearwardly to define an end portion 68 to which an operating link 70 is pivoted. The link 70 may extend to any desired accessible location whereby it may be manually moved downwardly to rotate the lever 62, to thus forcibly move the roller 58 from its tightly wedged position to a released position and thus relieve the stack of plates 26 and 28 of all clamping pressure and permit either rearward or forward swinging movement of seat back frame 6. As the lever 62 is rotated downward the surfaces 72 and 73 of the lever 62 and sleeve 52 engage and the sleeve 52 is caused to rotate clockwise as seen in FIG. 3 to thus forcibly move the roller 58 from its tightly wedged position to a released position and thus relieve the stack of plates 28 and 26 of all clamping pressure and permit either rearward or forward swinging movement of the seat back frame 6. Upon release of the manually operable rod 70 the spring 71 acts as a return spring for the rod 70 and any handle or attached control means. The spring 66 controls the force with which the roller 58 is wedged between the plates 28 and the surface 50. The spring 71 acts as a control means return spring.

Preferably, spring means (not shown) are provided between seat back frame 6 and frame portion 2 to normally urge the seat back to swing forwardly so that when the seat back has been swung rearwardly and downwardly and locked, mere release of the means 36 will permit the last-named spring means to swing the seat back upwardly and forwardly.

It is to be noted that self-energizing action of the roller 58 and release thereof all involve rolling contact between the roller and friction plates 28 and surface 50, thereby reducing the effort necessary to lock the link 16 or to release the roller 58 and eliminates all rotary sliding friction which would tend to prevent the normal self-energizing function of the link 16.

While a single specific embodiment of the invention is shown and described herein, it will be apparent to those skilled in the art that other embodiments may be devised.

I claim:

1 In a position-adjusting device having an extensible link, first and second aligned link portions; means guiding said portions for substantially rectilinear movement toward and from each other; a first plurality of friction plates fixed at one end to one of said portions and extending toward the other substantially parallel to the direction of relative movement between said portions; a second plurality of friction plates fixed at one end to the other portion and extending toward said one portion in interleaved relation to the plates of said first plurality and in frictional contact therewith to define therewith a laminar stack of plates; the improvement comprising: means fixed relative to said stack of plates and having a surface extending at an acute angle to the outermost plate on one side of said stack to define therewith a wedge-shaped space tapering in the direction of said movement; a roller in said space, of a diameter to simultaneously engage said outermost plate and said surface; and actuating means for selectively moving said roller in one direction in said space to apply transverse pressure to said stack of plates to frictionally bind the plates thereof against relative movement, and in the other direction to release said plates where by said portions may move relatively, said actuating means comprising a movable member having spaced opposed portions extending into said space to opposite sides of said roller; spring means urging said elements to move in a direction to wedge said roller between said surface and said plates; and manually operable means to move said elements in the other direction to release said roller.

2 An adjusting device as defined in claim 1 wherein said means having said surface comprises a generally cylindrical member having a flat chordal side defining said surface; said actuating means comprising a cylindrical sleeve journaled on the cylindrical surface of said member and having an axial slot in said space, said roller being positioned in said slot, the edges of said slot comprising said spaced opposed portions.

3. An adjusting device as defined in claim 2 wherein said spring means urges said sleeve to rotate in one direction on said member and a generally radial lever fixed to said sleeve comprises a portion of said manually operable means.

4. An adjusting device as defined in claim 3 including a generally U-shaped yoke embracing said stack of plates; an abutment at the bight of said yoke, engaging the outermost plate on one side of said stack; said member being mounted on and between the legs of said yoke with said roller engaging the outermost plate on the other side of said stack.